March 30, 1965  R. D. DUFF ETAL  3,175,301

GLASSWARE COOLING AND TRANSFER APPARATUS

Filed Nov. 21, 1961  3 Sheets-Sheet 1

INVENTOR
Richard D. Duff and
James W. Hackett
BY W. A. Schaich +
J. T. Innis
ATTORNEYS

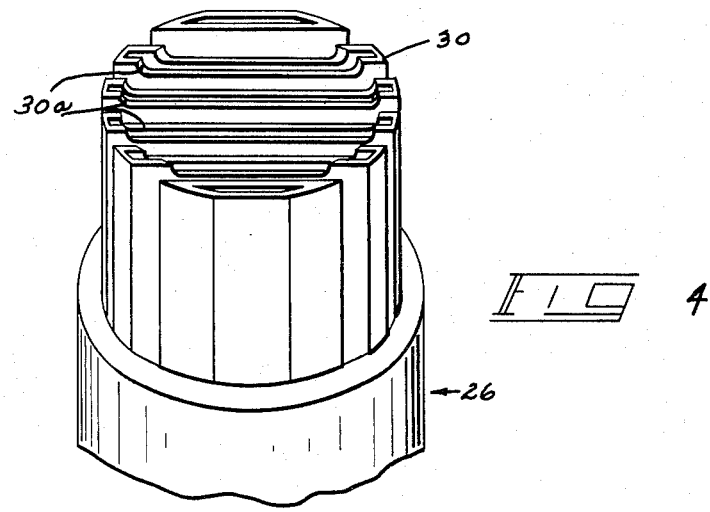
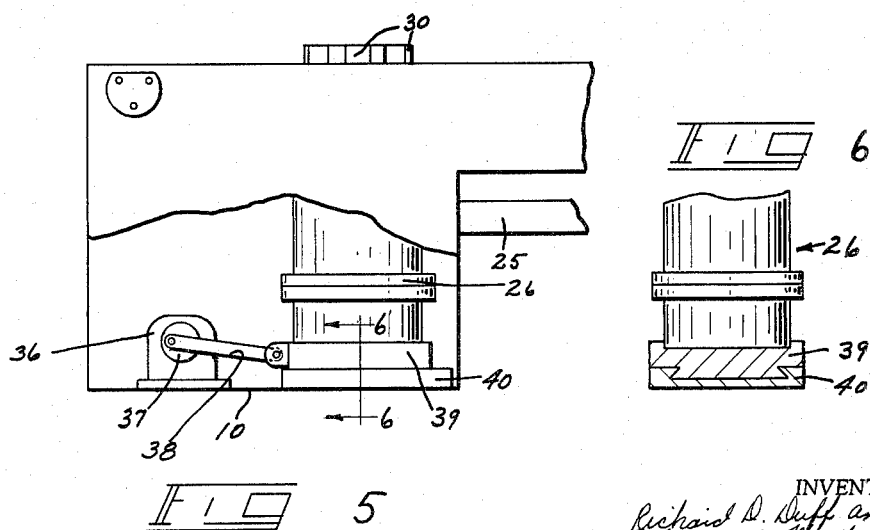

United States Patent Office 3,175,301
Patented Mar. 30, 1965

3,175,301
GLASSWARE COOLING AND TRANSFER APPARATUS
Richard D. Duff, Toledo, and James W. Hackett, Sylvania, Ohio, assignors to Owens-Illinois Glass Company, a corporation of Ohio
Filed Nov. 21, 1961, Ser. No. 153,872
7 Claims. (Cl. 34—105)

This invention relates to an apparatus for handling glassware and particularly to an apparatus for cooling and transferring glassware upon its removal from a forming machine. In the handling of the glassware after it has been formed and prior to its delivery to a lehr or other subsequent operation, it is the usual practice to place the article at an intermediate station and apply cooling air thereto to prevent deformation of the article due to the retained inherent heat of the glass.

With present day forming machines being operated at ever-increasing speeds, the problem of handling the ware removed from the forming machines is becoming more and more acute. Present methods of delivering ware from the machine to the lehr conveyor are not satisfactory because insufficient time is allowed for cooling the bottom and heel of the ware before it must support its own weight and the transfer operations are not smooth enough at the speeds required so that the ware can be handled without distortion or damage.

With the foregoing in mind it is an object of this invention to provide apparatus which will handle and transfer the ware removed from the forming machine without distorting the ware and will cool the ware sufficiently so that the ware may be self-supporting.

It is an additional object of this invention to provide apparatus for cooling and transferring ware from a forming machine in such a manner that the ware is efficiently cooled and transferred to a conveyor in a smooth even motion obviating the possibility of distorting or damaging the ware.

Other and further objects and advantages will be apparent from the following description taken in conjunction with the accompanying drawings wherein:

FIG. 4 is a side-elevational view of a modified ware transfer head.

FIG. 5 is a side-elevational view of the device of FIG. 1 with portions of the sidewall broken away to illustrate the mounting of the ware cooling and transfer head for oscillatory movement.

FIG. 6 is a cross-sectional view taken at line 6—6 of FIG. 5.

Figure 1:
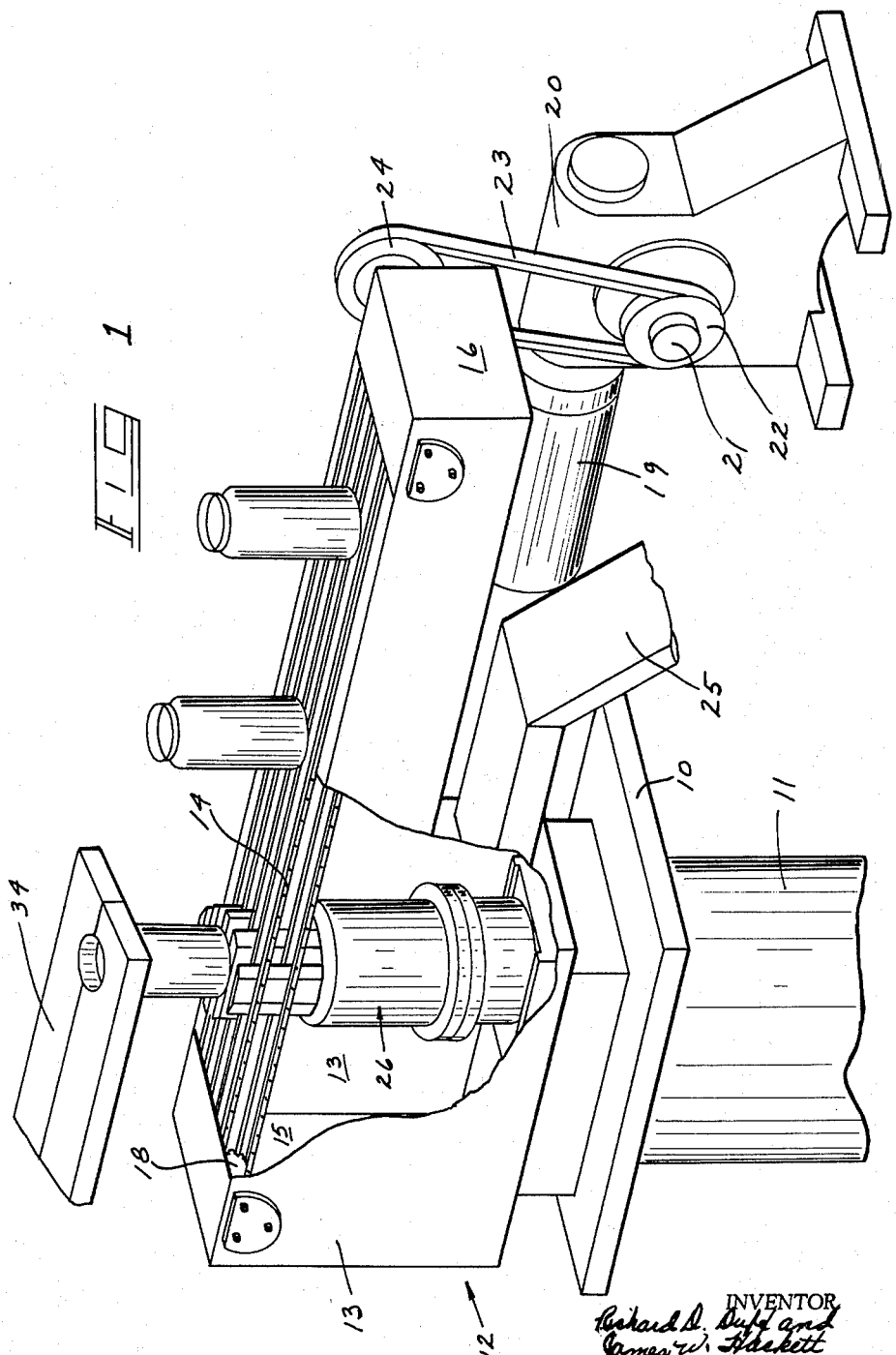
FIG. 1 is a schematic perspective view of the ware transferring and cooling device of the invention.

Referring to FIG. 1 the apparatus comprises a base 10 mounted on a stationary support member 11 which may form a part of a glass forming machine. The base 10 has mounted thereon a conveyor support 12 which takes the form of an enclosure having sidewalls 13 which extend along the sides of a multiple chain conveyor 14. The sidewalls are joined together at their ends by wall members 15 and 16 and also are closed at the bottom thereof so as to provide a completely enclosed chamber beneath the conveyor 14. The top of the support 12 is open along a substantial portion of its length and the conveyor 14, which is made up of a plurality of separate chains or endless members 17 is adapted to be driven so that the top surface forms an endless conveyor of substantial width moving from left to right as viewed in FIG. 1. The sidewalls 13 of the conveyor support rotatably, adjacent the ends thereof, shafts which carry sprocket wheels 18 which are rotatably mounted therein. The sprocket wheels 18 of which there are a plurality, equal in number to the number of chains 17, serve to both support and drive the chains. The sprocket wheels at the forward end of the conveyor 14 act as the driving means for the individual chains 17. The forward sprocket wheels are driven by a motor 19, coupled to suitable reduction gearing 20 which has an output shaft 21 carrying a pulley 22. The pulley 22 is coupled by a drive belt 23 to a pulley 24. The pulley 24 is fixed to a shaft which carries the series of sprockets at the right hand end of the conveyor. As previously described, the conveyor support 12 forms an enclosure into which cooling air is supplied through a passage 25. In this manner cooling air which is fed into the interior of the support 12 will move vertically upward through the spaces between the chains 17 to effect cooling of the conveyor 14 and glass articles which are conveyed thereby. Adjacent the left hand end of the conveyor 14 and mounted therebelow is a hydraulic motor generally designated 26.

Figure 2:
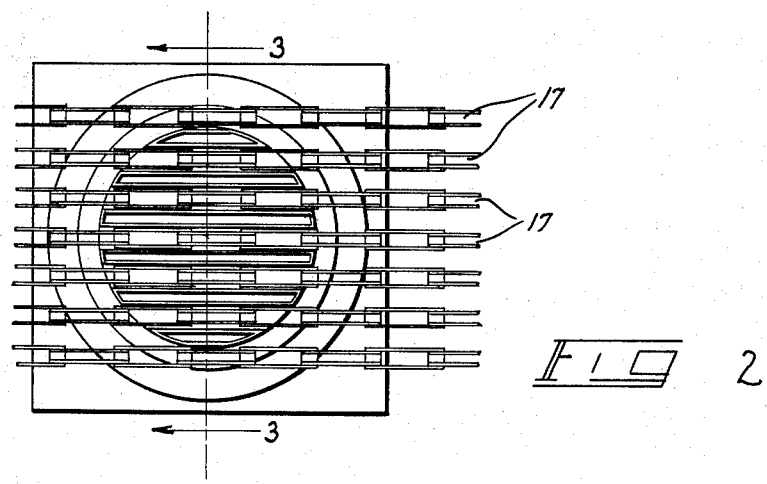
FIG. 2 is a top plan view of the ware cooling and transfer head of the invention.
Figure 3:
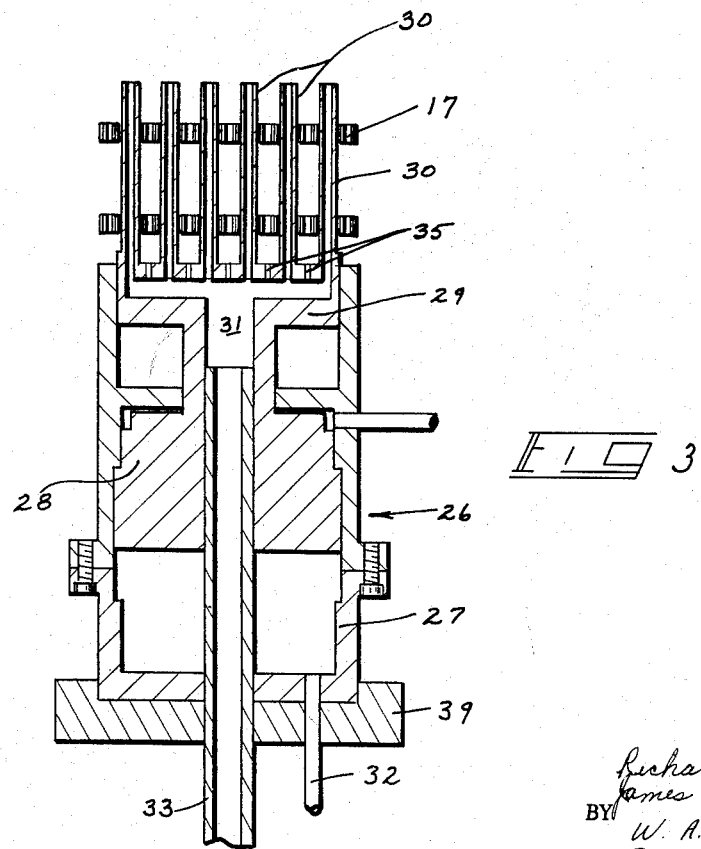
FIG. 3 is a cross-sectional view taken at line 3—3 on FIG. 2.

With reference to FIGS. 2 and 3 the hydraulic motor 26 comprises a cylindrical body 27 within which a piston 28 is vertically shiftable. The piston 28 carries an air manifold 29. The manifold portion 29 carries a plurality of thin walled hollow rib members 30 thereabove and the interior of the rib members are in communication with chamber 31 formed in the manifold 29. The rib members 30 are of relatively small overall width so that they may pass freely vertically between the spaces provided between the chains 17 upon actuation of the piston 28 in a vertical direction.

As shown in FIG. 3 the piston 28 has moved to its extreme upward position by the introduction of fluid under pressure through a conduit 32 which opens into the bottom of the cylinder 27. Cooling air under pressure is introduced to the air manifold chamber 31 through an axially extending conduit 33 which is fixed with respect to the cylinder 27 and extends through an axial opening formed in the piston 28. Movement of the piston between its two extremes of vertical movement will not remove the conduit 33 from the interior thereof and thus the conduit 33 provides communication of cooling air to the chamber 31 at all times.

As can best be seen when viewing FIG. 2 the upper ends of the rib members 30 generally describe a configuration corresponding to the shape of the bottom of the container, in this case a circle, when viewed from above and thus are adapted upon movement to the vertical position as shown in FIGS. 1 and 3 to provide a dead plate or ware-receiving surface for lowering ware from a forming machine.

As schematically shown in FIG. 1 the ware positioning portion of the forming machine, for example the arm 34, in the normal operation of the forming machine will position the completely formed ware at the same height and location each cycle of the machine. The arm 34 may be a portion of a rotatable turret, carrying partible neck rings, in a machine of the type shown and described in U.S. Pat. 2,903,824 to R. R. Denman et al., issued September 15, 1959.

When the arm 34 carries a completed article to the takeout position, the rib members 30 will be raised into the position shown in FIGS. 1 and 3 at which time the ware is released from the arm 34 and permitted to be supported at its bottom by the rib members 30. As previously described, cooling air is fed through the rib members 30 and in this manner assist in cooling the bottom of the jar which, when it reaches the takeout position, is still relatively hot. Also, additional passages 35 are provided in the top of the manifold 29 so as to permit cooling air to pass between the ribs 30 and cool the intermediate areas of the bottom of the jar after passing by the chains 17 in a vertical direction. After the jar has been released from the arm 34, the hydraulic motor 36 is adapted to lower the ware being carried by the rib members 30 to the upper surface of the chains 17.

As previously described the chains 17 are continuously driven so that as the ware is lowered to the level of the top surface of the chains 17, the ware will be moved from the rib members 30 and carried toward the right as viewed in FIG. 1.

Thus it can be seen that the handling of the relatively hot ware or articles is carried out in such a manner that the bottom of the jars will be cooled sufficiently before contact with the chains 17 so that the lower, bottom surface will be sufficiently set up that upon contact with the chains 17, the bottom of the jars will not be distorted.

The additional introduction of cooling air through the passage 25 to the interior of the conveyor support 12 provides for the cooling of the articles as they are conveyed away from the takeout position beneath the transfer arm 34. In this manner the ware is removed from the forming machine in a quick and easy manner and with a minimum amount of time involved in the takeout operation. Furthermore, by the provision of cooling air directly impinging on the entire ware bottom surface, the maximum cooling effect is obtained.

Referring to FIG. 4 there is shown a modification of the upper end portion of the rib members 30. As can be seen, the rib members are recessed at 30a so that there is a circular depression generally conforming to the bottom and lower heel portion of a container to be transferred. This configuration, shown in FIG. 4, is merely representative of other configurations which may be applied to the upper ends of the rib members 30 so as to conform to containers having unusual bottom shapes. In this manner containers which have a bottom shape susceptible to distortion or sagging may be effectively supported and cooled during the period when they are lowered to the surface of the continuously moving conveyor.

With reference to FIGS. 5 and 6 there is shown an additional feature of the invention which provides for smoother transfer of the ware from the rib members 30 to the chains 17. As can readily be seen, movement of the rib members 30 in a downward direction will carry the bottles downward and the chains which are moving at right angles to the direction of movement of the rib member will contact the bottom of the jar or bottle and move the jar in a horizontal direction. In order to avoid the possibility of this change of direction upsetting the articles being transferred, particularly in those cases where the articles are relatively small in diameter in comparison to their height, means are provided for horizontally shifting the hydraulic motor 26. This shift is accomplished by a motor 36, which is operated in synchronism with the lowering movement of the members 30. The motor 36 rotates a disc 37 which has a rod 38 connected thereto, adjacent its periphery. The rod 38 has its other end connected to the support 39 for the hydraulic motor 26. The support 39 is mounted in a slideway 40 carried by the base 10. The rotation of the disc 37 will cause the support 39 to move horizontally to a limited extent. This movement is in synchronism with the operation of the forming machine and the downward movement of the rib members 30 so that the shifting of the motor 26 to the right, as viewed in FIG. 5, is affected just prior to the complete retraction of the rib members 30. In this manner ware is moved in the direction of movement of the chains 17 while still supported by the rib members.

In this manner the transfer from the rib members to the chains 17 is smooth and avoids the possibility of bottle inertia causing the bottles to be tipped over by the movement of the chains 17.

While the above description has stated that the chains 17 are operated at a constant or controlled speed, it should be obvious that depending upon the type of ware being handled the chains may be intermittently driven and the ware may remain on the dead plate structure or on the chains for any period of time required to provide adequate cooling of the ware or glass articles.

While this invention has been described as being used with a forming machine such as shown in the above-referred to Denman et al. patent, it should be pointed out that as a takeout device, the invention is equally applicable to any forming machine in which the ware is carried to a takeout position and released. For example, the apparatus of the invention has application with the well-known Hartford I-S machine and will take the place of the dead plate or cooling area which is necessary on the presently existing I-S machine.

Various modifications may be resorted to within the spirit and scope of the appended claims.

We claim:

1. Apparatus for transferring ware from a forming machine wherein the ware is positioned by the machine at a takeout station each cycle of the machine, comprising a continuous conveyor having a generally horizontal upper surface, said conveyor being composed of a plurality of coextensive side-by-side endless members, means for driving said members at a controlled speed, a ware transfer head mounted beneath said conveyor adjacent one end therof, said head having a plurality of vertically extending thin-walled hollow rectangular elements mounted thereon, said elements being opened at their upper ends, each element adapted to extend through the space between the side-by-side endless members, means for raising and lowering said head, means for conducting air under pressure to the interior of said hollow elements, said elements forming at their upper ends a supporting surface for ware released from the forming machine at the takeout station, whereby released ware may be lowered to the surface of said conveyor by retraction of said elements.

2. The apparatus as defined in claim 1 further including means for moving said elements in the direction of movement of said conveyor to thereby transfer ware from the elements to the conveyor in a smooth motion.

3. Apparatus as set forth in claim 1 further including a support for said conveyor, said support forming a closure for the area beneath the conveyor and means for introducing a cooling medium into the said support closure, whereby said cooling medium will move upwardly through the endless members to aid in cooling the ware.

4. Apparatus for transferring ware from a forming machine wherein the ware is positioned by the machine at a takeout station each cycle of the machine, comprising a continuously moving conveyor having a generally horizontal upper surface, said conveyor being composed of a plurality of coextensive side-by-side endless members, means for driving said members at a controlled speed, a ware transfer head mounted beneath said conveyor adjacent one end thereof, a plurality of thin walled hollow rectangular elements carried by said head and extending vertically thereabove, said element being opened at their upper ends, each element adapted to extend through the space between adjacent side-by-side endless members, means for raising and lowering said head and elements, means for conducting air under pressure to the interior of said hollow elements, the upper ends of said elements forming a supporting surface for ware released from the forming machine when in their raised position at the takeout station, the upper ends of said members being recessed in their center to conform to the configuration of the bottom of ware being lowered to the surface of the said conveyor by retraction of said elements.

5. The apparatus as defined in claim 4 further including means for moving said elements in the direction of movement of said conveyor prior and during the period of transfer of the ware from the elements to the conveyor.

6. Apparatus as set forth in claim 4 further including a support for said conveyor, said support forming a closure for the area beneath the conveyor and means for introducing a cooling medium into the said support closure, whereby said cooling medium will move upwardly through the members to aid in cooling the ware carried thereby.

7. Apparatus for transferring ware from a forming machine wherein the ware is positioned by the machine at a takeout station each cycle of the machine comprising, a continuously moving conveyor having a generally horizontal upper surface, said conveyor being composed of a plurality of coextensive side-by-side endless members, means for driving said members at a controlled speed, a ware transfer head mounted beneath said conveyor adjacent one end thereof, said head having a plurality of vertically extending elements mounted thereon, each element adapted to extend through the space between the side-by-side endless members, means for raising and lowering said head, said elements forming at their upper ends, a supporting surface for ware released from the forming machine at the takeout station, and means for moving said elements in the direction of movement of said conveyor as the ware approaches the surface of said conveyor, whereby released ware may be lowered to the surface of the said conveyor by retraction of said elements.

References Cited by the Examiner
UNITED STATES PATENTS

| | | | |
|---|---|---|---|
| 1,518,852 | 12/24 | Johnson | 65—348 |
| 2,182,167 | 12/39 | Berthold | 65—348 |
| 2,262,799 | 11/41 | Everett | 198—24 |
| 2,833,088 | 5/58 | Olson et al. | 65—348 |

NORMAN YUDKOFF, *Primary Examiner.*

DONALD SYLVESTER, *Examiner.*